(12) United States Patent
Lewis et al.

(10) Patent No.: US 7,047,796 B2
(45) Date of Patent: May 23, 2006

(54) MULTIPLE PLATE TIP OR SAMPLE SCANNING RECONFIGURABLE SCANNED PROBE MICROSCOPE WITH TRANSPARENT INTERFACING OF FAR-FIELD OPTICAL MICROSCOPES

(75) Inventors: Aaron Lewis, Jerusalem (IL); Anatoly Komissar, Jerusalem (IL); Hisham Taha, Jerusalem (IL); Alexander Ratner, Jerusalem (IL)

(73) Assignee: Nanonics Imaging, Ltd., Jerusalem (IL)

( * ) Notice: Subject to any disclaimer, the term of this patent is extended or adjusted under 35 U.S.C. 154(b) by 82 days.

(21) Appl. No.: 10/487,391

(22) PCT Filed: Aug. 27, 2002

(86) PCT No.: PCT/US02/25947

§ 371 (c)(1),
(2), (4) Date: Feb. 23, 2004

(87) PCT Pub. No.: WO03/019238

PCT Pub. Date: Mar. 6, 2003

(65) Prior Publication Data

US 2004/0216518 A1 Nov. 4, 2004

(30) Foreign Application Priority Data

Aug. 27, 2001 (IL) ....................... 145136

(51) Int. Cl.
*G01N 13/10* (2006.01)
*G12B 21/20* (2006.01)
*G12B 21/22* (2006.01)
(52) U.S. Cl. .................. 73/105; 250/306; 250/307
(58) Field of Classification Search .............. 73/105; 250/306, 307
See application file for complete search history.

(56) References Cited

U.S. PATENT DOCUMENTS 5,289,004 A * 2/1994 Okada et al. .............. 250/306

(Continued)

*Primary Examiner*—Daniel S. Larkin
(74) *Attorney, Agent, or Firm*—Jones, Tullar & Cooper, PC

(57) ABSTRACT

The invention is directed to a scanned probe microscope including one plate allowing for tip scanning and the other allowing for sample scanning, with the optical axis of the scanned probe microscope being free to permit incorporation into standard optical microscopes. The top plate can be hinged onto the bottom plate, or the top plate can simply be placed on the bottom plate and a rough approach is caused by a dc motor or other mechanism which will enable the two flat plate scanners to have a large z range. In another embodiment, the microscope includes three plates which allow sample scanning, tip scanning and two tips to be operational at the same time.

A microscope in accordance with the invention may use a liquid cell, may use a near-field optical element made of silicon cantilever technology, or may use an apertureless probe for apertureless near-field scanning optical microscopy.

The microscope may use a tuning fork for feedback in any combination of geometries of tip, sample and tuning fork and with or without gluing of the tip to the tuning fork and with control of tip attachment or near-attachment to the tuning fork. The control of tip attachment to the tuning fork may be based on near zero backlash movement technology, and the tuning fork can be used in non-contact, contact and intermittent contact modes of operation. A fiber based feedback system may use either straight or cantilevered fibers, and the detection of signals may be based on amplitude, phase, wavelength or other optical parameters that can be used to monitor the movement of an SPM sensor.

28 Claims, 10 Drawing Sheets

U.S. PATENT DOCUMENTS

| | | | |
|---|---|---|---|
| 5,440,920 A * | 8/1995 | Jung et al. .................... 73/105 |
| 5,949,070 A * | 9/1999 | Gamble ..................... 250/306 |
| 5,990,477 A | 11/1999 | Tomita |
| 6,246,054 B1 | 6/2001 | Toda et al. |
| 6,249,000 B1 | 6/2001 | Muramutsu et al. |
| 6,257,053 B1 | 7/2001 | Tomita |

* cited by examiner 4.1

4.2

An upper plate with Laser Diode and PSD design variant

A low temperature version of a multiple plate design: in this case this is a two plates design in a cryostat

MULTIPLE PLATE TIP OR SAMPLE SCANNING RECONFIGURABLE SCANNED PROBE MICROSCOPE WITH TRANSPARENT INTERFACING OF FAR-FIELD OPTICAL MICROSCOPES

FIELD OF THE INVENTION

The field of this invention is the design of a unique ultra-thin scanning probe microscope that can readily operate and be flexibly re-configured in various different modes of operation with features that have never been previously available. The invention permits unique capabilities in scanned probe microscopy while allowing for full integration with a far-field optical microscope upright or inverted. It also allows for ready integration into low temperature optical cryostats and for use with various accessories. It also allows a variety of tip scanning schemes to be implemented.

BACKGROUND OF THE INVENTION

Scanned probe microscopes (SPM) have passed through many phases of development in the past two decades. A critical juncture in the development of these microscopes was the application of the tube piezoelectric scanner, which had previously been used for many years in the phonograph. This scanner was used first in atomic force microscopes (AFM) [G. Binnig and D. P. E. Smith, Rev. Sci. Instrum. 57, 1688 (1986)], which has led the way in the development of a whole variety of similar microscopes that are generally classed as SPMs.

In addition to the above, a SPM design was developed which used three tube scanners, which could scan a sample by coordinated operation [K. Besoka, Surf. Sci. 181,145 (1986)]. Furthermore, a four tube scanner was also described which allowed sample scanning by coordinated operation of the piezoelectric elements [K. Lieberman, N. Ben-Ami and A. Lewis, Rev. Sci. Instr. 67, 3567 (1996)].

Finally, a feedback mechanism was patented based on tuning forks used in watches [K. Karrai and M. Haines, U.S. Pat. No. 5,641,896] for scanning the probe or the tip that is used in SPM in close proximity to the sample. The tuning fork acts to control distance and to provide a method of distance regulation for a tip relative to the sample. This patent, however, was limited in that it required a specific direction of motion of a straight tip relative to the straight tip axis and the sample, and allowed only the use of shear force rather than normal force feedback.

The Karrai and Haines mechanism was invented for, and has been used extensively in, near-field scanning optical microscopy (NSOM). In these scanned probe microscopes an optical fiber is pulled to a small conical tip and this conical tip is coated with metal to form an aperture. Light is then passed through the optical fiber and emanates from the aperture with the dimension of the aperture.

The conical tip could be attached to one of the tines of a tuning fork for distance regulation of the tip and the sample. In this method the tuning fork resonates at a specific resonant frequency, which is generally used as a reference in watches. A straight fiber ending in a conical tip as described above is attached along one of the tines of the fork in a very specific geometry with the tip extending from the tine. The rest of the fiber is placed along the length of the tuning fork and is attached on the entire length. On this assembly a frequency is imposed. As the tip/tuning fork assembly approaches a surface with the tip oscillating at the imposed frequency there is an alteration in the tuning fork oscillation amplitude and phase and this is used to alter the position of the tip so that a tip/sample distance is maintained.

As noted above, the invention of Karrai and Hines was very limiting since it could be used only in a a specific geometry of tuning fork/straight optical fiber assembly. However, of even more importance is that it became evident, during the use of such assemblies, that the characteristics of the tuning fork could be drastically affected by attaching an optical fiber tip to one of its tines, and this was independent of other geometries that were attempted [[H. Muramatsu, N. Yamamoto, T. Umemoto, K. Homma, N. Chiba and M. Fujihara, Jpn. J. Appl. Phys. 36, 5753 (1997)] and silicon cantilevers on one of the tines of a tuning fork [W. H. J. Rensen, N. F. van Hulst, A. G. T. Ruiter and P. E. West, Appl. Phys. Lett. 75, 1640 (1999)].

One alteration, that was specifically important, was the reduction in Q factor in an uncontrolled fashion. Recently [D. N. Davydov, K. B. Shelimov, T. L. Haslett and M. Moskovits, Appl. Phys. Lett. 75, 1796 (1999)], there was an attempt to address this problem. These workers suggested that one of the reasons for this alteration in Q factor was a breaking of the symmetry of the tuning fork when such a fiber tip was attached to one of the tines [D. N. Davydov, K. B. Shelimov, T. L. Haslett and M. Moskovits, Appl. Phys. Lett. 75, 1796 (1999)]. These workers indicated that the placement of the straight optical fiber tip in a position that minimized the symmetry breaking could affect the extent of alteration of the Q factor. In addition, the mass of the fiber was given as another reason for the problems with tuning fork techniques. However, no direct control on the extent of the alteration in the Q factor was achieved. The problems raised by Davydov et al are symptomatic of the general problems of the tuning fork technique.

Tube scanning systems either with or without tuning forks have previously been employed to design either microscopes for sample scanning or to design microscopes for tip scanning, but in all the years since the introduction of the tube scanner or the tuning fork for straight tip shear force feedback, it has not been possible to design a microscope that had both tip and sample scanning.

Furthermore, a method and a device for controlled loading of a tuning fork/tip assembly has not been described in the prior art, and the geometries for tip and tuning fork that this control permits, in the present invention, could not be achieved. In addition, no method previously existed to lower, in a controlled fashion, the mass of the glue required for attaching a scanned probe tip to a tuning fork, which our invention indicates is a major problem in using such a method of feedback and in achieving usable geometries in order to form a tip/sample scanning scanned probe microscope. In addition, there is no report of a tuning fork system that has been designed without the need for gluing the tip to the tuning fork. Finally, the variety of other methods of tip feedback available in accordance with the present invention and that permit the tip/sample scanning microscope system of the invention, have not previously been described.

In addition, no prior tip scanning microscope could be placed on an upright conventional optical microscope so that the lens of the upright microscope could simultaneously view the scanned probe microscope during operation. This is important, not only to position the tip in the wider field of view but also to simultaneously collect light from a sample illuminated with a tip suitable for near-field scanning optical microscopy. It is also crucial for calibration of the optical microscope image with the near-field optical and atomic force microscopy tip.

All of the above is true not only for commercial versions of SPMs but for any reported laboratory versions.

SUMMARY OF THE INVENTION

In accordance with the present invention, it has been discovered that neither the symmetry of the placement of the tip on the tuning fork nor the mass of the fiber are the important elements in producing the less than ideal characteristics of tuning forks; instead, the present invention indicates that the main problem is the glue that is used to attach the fiber to the tuning fork. Accordingly, the invention is directed to an approach that allows for the loading of a tuning fork in a way that resolves the foregoing problems in a reproducible way. The invention is also directed to a variety of other methods for feedback that compete with tuning fork feedback even when tuning fork feedback is working optimally as a result of the present invention.

The present invention develops one of three different methods for scanning cantilevered silicon or glass AFM type tips in order to use flat scanners to develop a unique scanning probe instrument that is based on a series of interchangeable ultra-thin plates that allow tip and sample scanning in a variety of emulations.

As part of this development, a method and a device for controlled tuning fork/tip assembly are provided to achieve the geometries for tip and tuning fork that permit a tip/sample scanning SPM to be built. In addition, the invention describes a method to lower, in a controlled fashion, the mass of the glue remaining after attaching a scanned probe tip to a tuning fork or to completely eliminate the glue in this assembly. This method is applicable not only to the present tip/sample scanning design but to all uses of tuning forks. Furthermore, it has been found that the loading of the tip on the tuning fork must be accomplished without inducing axial deformation and extension in the fiber, and this is also applicable not only to the present tip/sample scanning design but to all uses of tuning forks. Finally, other approaches to feedback are described that allow for the improved tip/sample scanning design of the invention.

The ultra-thin SPM microscope that results from the present invention incorporates the first tip scanning system that can be placed on any optical microscope upright or inverted. It is the first SPM that permits tip or sample scanning in the same instrument and that can be switched from an AFM mode of operation where the tip is in non-contact or intermittent contact with the sample to a contact mode of operation where the tip is in contact all the time with the sample. It is also the first tip or sample scanning system that permits all the lenses of an upright optical microscope to be rotated freely during SPM operation, and is the first SPM that permits two independently controlled tips to be brought in contact with a sample. The invention readily allows the microscope to be inserted into an optical or other cryostat for low temperature operation with one or all of the features noted above. It can also be used for confocal optical microscopy and can work with accessories that permit operation in a liquid environment.

Accordingly, the invention is directed to a two plate scanned probe microscope including a top plate and a bottom plate, one plate allowing for tip scanning and the other allowing for sample scanning, with the optical axis of the scanned probe microscope being free to permit incorporation into standard optical microscopes. In one embodiment of the invention, the top plate can be hinged onto the bottom plate and a rough approach of the probe to the sample is caused by a dc or other motor. In another embodiment, the top plate is simply placed on the bottom plate and a rough approach is caused by a dc motor or other mechanism which will enable the two flat plate scanners to have a large z range.

In another embodiment, the top plate is replaced with one having regular beam deflection while keeping the optical axis free, and in still another embodiment, the microscope includes three plates which allow sample scanning, tip scanning and two tips to be operational at the same time. A flat plate tip scanner can work with any chosen scanning stage including those that are attached to regular microscopes.

The device of the present invention works within the confines of a conventional cryostat in which the sample can be cooled to as much as 4° K.

A microscope in accordance with the invention may use a liquid cell in which a sample is held in a sample scanning plate and a tip is held in a tip mount in the tip scanner plate and may include a top plate that works using standard beam deflection technology but with the optical axis of the device unobstructed for viewing with a lens. This lens may be a solid immersion lens. The microscope may also use a near-field optical element made of silicon cantilever technology, and may use an apertureless probe for apertureless near-field scanning optical microscopy. The microscope may also be used for atomatic and semi-automatic assembly of optical components, including fibers and fiber lenses with added lasers and other devices, and including welding or other procedures for attachment of components or other devices, may be used.

The microscope may use a tuning fork for feedback in any combination of geometries of tip, sample and tuning fork and with or without gluing of the tip to the tuning fork and with control of tip attachment or near-attachment to the tuning fork. The control of tip attachment to the tuning fork may be based on near zero backlash movement technology, and the tuning fork can be used in non-contact, contact and intermittent contact modes of operation. A fiber based feedback system, with single or multiple channel fibers for beam delivery and collection for feedback, may use either straight or cantilevered fibers, and the detection of signals may be based on amplitude, phase, wavelength or other optical parameters that can be used to monitor the movement of an SPM sensor. The feedback signal may be based on internally reflected light from a subwavelength tip at the tip of a waveguide, if desired.

The invention is also directed to a method of scanned probe microcopy which uses a two plate scanned probe microscope, one allowing for tip scanning and the other allowing for sample scanning, with the optical axis of the scanned probe microscope being free for incorporation into standard optical microscopes, wherein a tuning fork is used for feedback in any combination of geometries of tip, sample and tuning fork and with or without gluing of the tip to the tuning fork and with control of tip attachment or near-attachment to the tuning fork. The control of tip attachment to the tuning fork is based on near zero backlash movement technology, and the tuning fork can be used in non-contact, contact and intermittent contact modes of operation. A fiber based feedback system with single or multiple channel fibers for beam delivery and collection for feedback with these fibers being either straight or cantilevered and detection of signals based on amplitude, phase, wavelength or other optical parameters can be used to monitor the movement of a SPM sensor.

Although the invention is described herein in terms of its use with any optical microscopes, including evanescent wave optical microscopes or stage or beam scanning confocal microscopes either with illumination through a regular lens or with a fiber probe with and without a lens or a fiber with an integral lens, it will be understood that in other embodiments the invention can be used to integrate the described sequence of single or multiple plate scanned probe microscopes in any microscopic, lithographic or spectrographic (including wave and x-ray dispersive or cathodluminescence spectroscopic) system in which a beam is directed from the top or bottom or both and that it can be used in such geometries with any probe that can be used in a scanned probe system and these include all probes whose cantilever does not obscure the beam from above or below including probes for atomic force, near-field and far field optical, nano and micropipette probes for chemical delivery or suction or electrical measurements or collection or deliver of electromagnetic radiation, or thermal probes, or magnetic probes or other probes and combination or probes that can be used with scanned probe microscopes. This permits, in addition to the scanned probe microscope channel, a channel of illumination from the microscope being integrated, that could be an optical, an electron optical, or an ion beam illumination or other beam directing system. This results from the fact that the scanned probe microscopes described in this application, either in a single or multiple plate version, have probes and their associated scanning mechanisms where the cantilever of the probe or the scanning mechanism does not obscure illumination from the top.

In still another embodiment, a single or multiple plate version of these microscopes could be combined with any beam directing system, including high vacuum deposition systems where in situ information on the deposited film thickness is important without the removal of the deposited film from the vacuum chamber to a scanned microscope or a scanning electron microscope for such measurements. Such deposition systems could include any thin film deposition system based on thermal or electron or ion beam or atomic beam or molecular beam deposition systems.

Thus, in broad terms, the invention relates to a single or multiple plate scanned probe microscope that can include a single plate tip scanning system or a top scanner plate and a bottom scanner plate, one plate allowing for tip scanning and the other allowing for sample scanning, with the axis of the scanned probe microscope free for incorporation into a beam directing system that requires the axis of the scanned probe microscope system to be free either from the top, the bottom, or both.

BRIEF DESCRIPTION OF DRAWINGS

The foregoing, and additional objects, features and advantages of the present invention will be understood from the following detailed description of preferred embodiments thereof, taken with the accompanying drawings, in which.

DETAILED DESCRIPTION OF PREFERRED EMBODIMENTS

1. Tuning Fork Feedback

Figure 1:
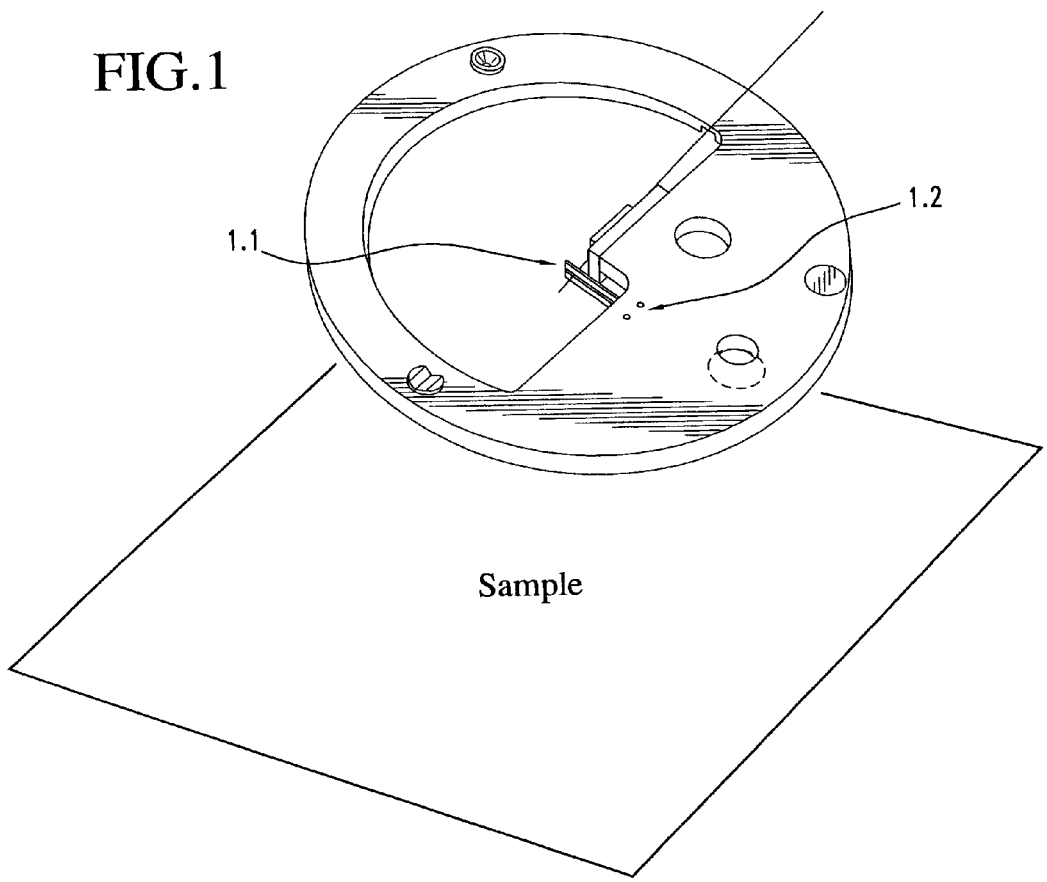
FIG. 1 is a diagrammatic top perspective illustration of a tuning fork tip mount oriented above a sample.
Figure 2:
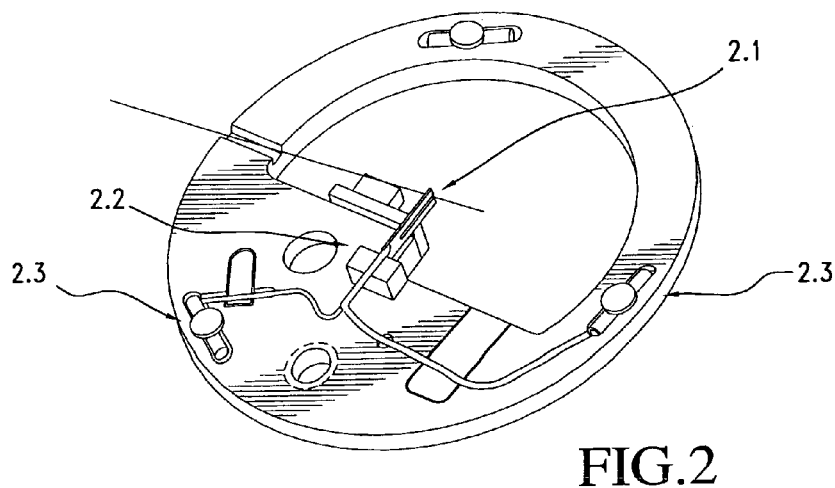
FIG. 2 is a diagrammatic bottom perspective illustration of the tuning fork tip mount of FIG. 1
Figure 3:
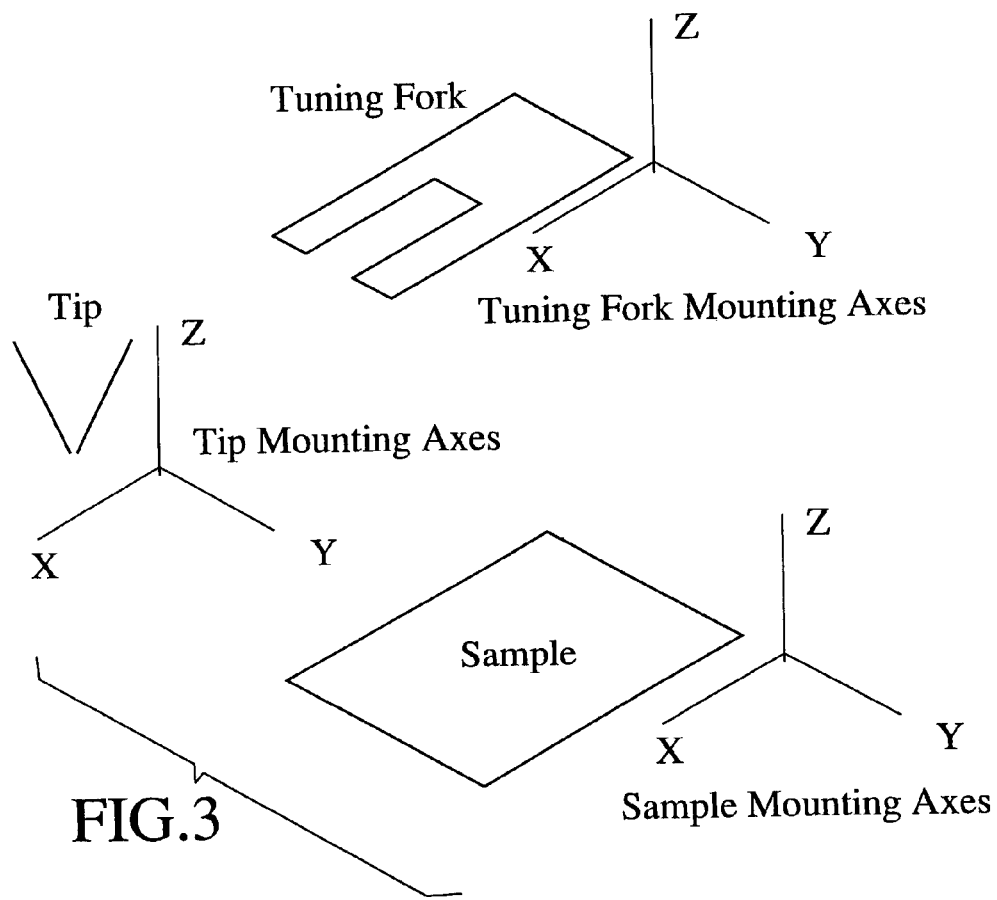
FIG. 3 is a diagrammatic illustration of possible axis orientations for a tuning fork, a tip and a sample.
Figure 4A:
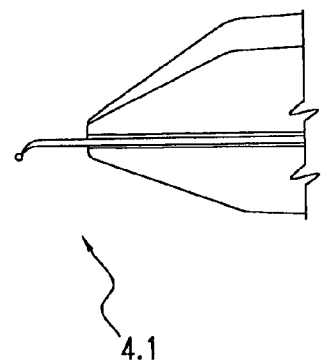
FIG. 4A is a photomicrograph of a cantilevered optical fiber near-field optical and atomic force sensor.
Figure 4B:
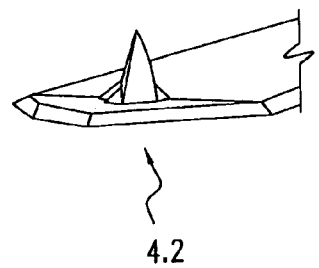
FIG. 4B is a photomicrograph of a cantilevered silicon sensor tip.

In one preferred method of the invention, illustrated in FIGS. 1 and 2, a tuning fork (1.1 and 2.1) is mounted on a fork holder (2.2). The mounting of the tuning fork on the fork holder can be in one of several directions. The tuning fork can be used as has been shown in FIGS. 1 and 2, or can be placed, in accordance with the invention, in any relative orientation to the sample. In FIG. 3 the tuning fork is diagrammatically shown with three imposed axes. Sample and tip axes are also indicated. The tuning fork can be placed with the z axis parallel to the sample z axis or any other of the tuning fork axes can be placed parallel to the sample z axis; other orientations are also possible. The oscillation of the tuning fork is along the y axis of the tuning fork Also shown in FIG. 3 is a SPM tip relative to its own set of axes. The tip can be associated with either a straight fiber or a cantilevered fiber (4.1), as illustrated in FIG. 4A, or with a silicon cantilever (4.2), illustrated in FIG. 4B, but the important orientation is that of the tip relative to the sample and the tuning fork axes. The tip is always positioned pointing, as in the FIG. 3 diagram, to the negative z axis. However, the actual feedback signal that is obtained depends on how the z axis of the tip is positioned relative to the y axis oscillation of the tuning fork. For example, as illustrated in FIG. 1, the tuning fork is positioned with its y axis parallel to the sample z axis. The tip is positioned with its z axis perpendicular to the tuning fork y axis and the cantilever is positioned perpendicular to the tuning fork x axis. In this configuration, because the tuning fork is oscillating along its y axis the tip will be oscillating normal to the sample surface and parallel to the sample z axis. This will give a feedback signal that is a normal force feedback, where the sample imposes a normal force on the tip and this is felt by the tine of the tuning fork that has the tip associated with it.

Figure 5:
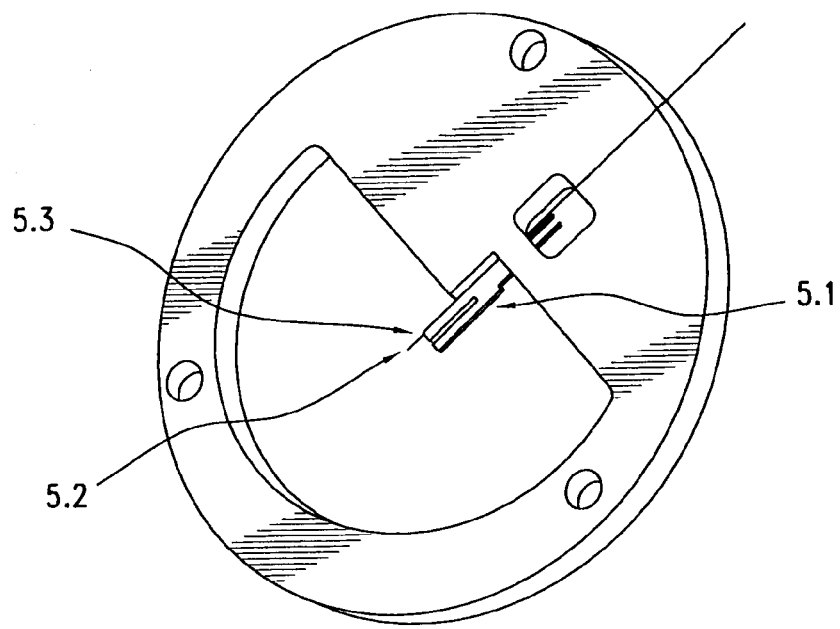
FIG. 5 is a diagrammatic top perspective illustration of a second embodiment of a tuning fork tip mount.

In another example, as in FIG. 5, the tuning for k (5.1) is positioned with its y axis perpendicular to the sample z axis. The cantilevered tip is positioned with its z axis perpendicular to the tuning fork y and z axes and the cantilever is positioned perpendicular to the tuning fork y and z axes. In this configuration, because the tuning fork is oscillating along its y axis the tip will be oscillating laterally to the sample x y plane and perpendicular to the sample z axis and the force that is used for the feedback signal is called lateral force. In this example, the lateral motion is along the x or y axis depending on the position of the mount on which the tuning fork has been placed.

Figure 6:
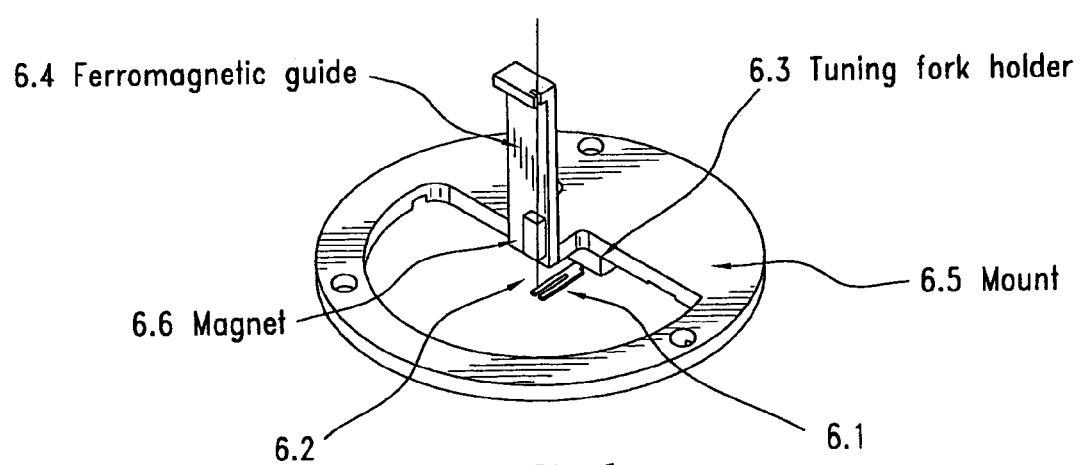
FIG. 6 is a diagrammatic top perspective illustration of a third embodiment of a tuning fork tip mount.

In another example, as in FIG. 6, the tuning fork (6.1) is positioned with its y axis perpendicular to the sample z axis. The tip (6.2) is positioned with its z axis perpendicular to the tuning fork y and x axes and since this is a straight tip there is no cantilever. In this configuration, because the tuning fork is oscillating along its y axis the tip will be oscillating laterally to the sample xy plane and perpendicular to the sample z axis. In this example the lateral motion is along the x or y axis, depending on the position of the mount on which the tunning fork has been placed. Although three emulations have been physically shown in FIGS. 1, 5 and 6, these are by no means the only orientations and as noted above a variety of orientations are possible.

However, none of these orientations would be possible if the mounting technology that is the basis of this invention was not realized. In the mounting, as illustrated in FIG. 6, there are three elements. First, there is the holder (6.3) through which the tuning fork is placed and then there is a ferromagnetic guide (6.4). The holder and the ferromagnetic guide are attached to the same mount (6.5). Either the cantilever or the fiber that is attached to the tip is glued, in one emulation, to a magnet (6.6) and the magnet is placed on the ferromagnetic guide to provide a magnetic slider assembly that is without backlash and is not preloaded, as is the case with every mechanical connector, such as springs or threads. Thus, there are no additional forces imposed on the connection between the fiber and the fork, and this connection is mechanically stable to the extremely small motions that are imposed for force feedback.

In one preferred embodiment, the connection is adjusted so that the tip is brought in close proximity to the tuning fork while the oscillation characteristics of the tuning fork are being measured. The movement of the tip toward the tuning fork is stopped before physical contact and this is monitored by measured one or all of the resonance frequency, amplitude and phase. The distance achieved depends on the sensitivity of the measurement of the tuning fork oscillation characteristics, but at a distance that is as close as possible and this is accomplished by using the ferromagnetic guide and the magnet which is a slider assembly without backlash. At this point the cantilever or fiber can be glued. After gluing, the resonance frequency of the assembly is checked to ensure that a resonance can be monitored.

Alternate arrangements could involve the use of a capillary for ease of holding the fiber or other movement technology that could meet the characteristics for bringing the tip to the tuning fork by measuring the oscillation characteristics of the tuning fork and being able to stop without touching the tuning fork.

After the glue has dried the mass of the glue can be reduced to a minimum by careful addition of solvent. The electrical connections of the tuning fork are attached to the body of the mount (1.2 and 2.3) so that an electrical signal can be imposed to vibrate the tuning fork.

Figure 7:
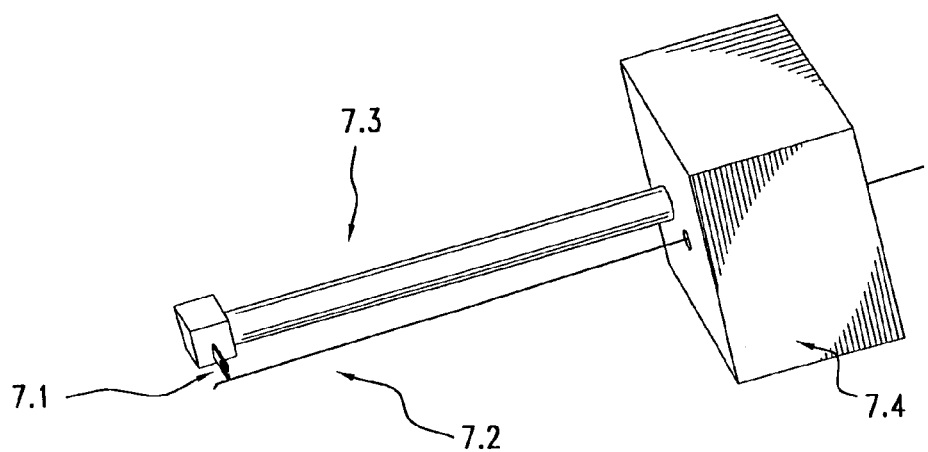
FIG. 7 is a diagrammatic top perspective illustration of a tip mount for a contact mode of operation with a tuning fork.

In another arrangement, no glue is necessary between the fork and the tip. In such an arrangement, one example of which is shown in FIG. 7, the tuning fork (7.1) and the cantilevered or straight tip (7.2) can be moved relative to one another by appropriate attachment of the tip and the cantilever or straight tip to a piezo transducer or other nanotranslation device (7.3). This device (7.3) can effect a relative motion of the tip and the tuning fork. Obviously all other geometries as described above for the tuning fork, AFM sensor and sample can be envisioned. The tip and the tuning fork, and even the piezo element, may be produced as one item in a microfabricated fashion. In all of the above it should not be neglected that the tuning fork itself can also be used as an AFM sensor without any tip.

This method and device for bringing the SPM sensor in close contact to the tuning fork provides contact and non-contact modes of AFM using a tuning fork technique. A device, such as the piezo transducer (7.3), is attached to the common holder (7.4) that also holds the AFM sensor (7.2). The tip of the AFM sensor is positioned in close and controlled proximity to the tuning fork with the piezo device being used to move, with control, the tuning fork to the AFM sensor tip to a distance that allows the tuning fork to feel the existance of the AFM sensor tip. Changes in the amplitude and phase of the tuning fork can be used as a feedback signal as the AFM sensor tip moves up and down in response to the sample geometry. This motion changes the distance between the AFM sensor cantilever and the tuning form, and this alters the oscillation amplitude and phase of the tuning fork.

In summary, this feedback method for use in the development of tip and sample scanning in scanned probe microscopes is based on the fact that the method of loading of the tip is much more important than any destruction in the symmetry of the fork or mass of the fork as previous authors [D. N. Davydov, K. B. Shelimov, T. L. Haslett and M. Moskovits, Appl. Phys. Lett. 75, 1796 (1999)] have indicated as the source of the problems of tuning fork feedback, as described by Karrai and Hines [K. Karrai and M. Haines, U.S. Pat. No. 5,641,896] and all other authors that have used geometries other than those invented by Karrai and Haines. As part of this loading methodology, the mass of the glue is much more important than any symmetry problems and is even more important than the mass of the probe as was suggested by Davydov et al. Furthermore, the lack of stress is also of great importance when loading the tip to the tuning fork. In all cases above either one tine can be vibrated and measurements made from the tine, or both can be vibrated simultaneously together.

2. Integrated Fiber Beam Deflection Feedback

An alternate method for tip scanning feedback, that would allow integration into flat or other scanners and would allow for the tip or sample SPM, is based on standard beam deflection methodologies in which a diode laser beam is reflected off the cantilever of an AFM sensor and onto a position sensitive detector. This is by far the most extensively used method of AFM feedback. A significant problem in applying such a method to tip scanning is to keep the beam on the cantilever so that the reflection occurs in a stable fashion off the cantilever or off a straight tip while the tip is being scanned. In general, the solution is a complicated mirror system that adjusts the position of the beam as the tip scans, but this obscures the top of the sample from direct view with a standard optical microscope when one is dealing with a cantilevered tip. As part of the present invention of a tip and sample scanning microscope system, two new methodologies for beam deflection feedback have been developed that will allow for tip scanning without the complicated mirror system that has been the norm.

Figure 8:
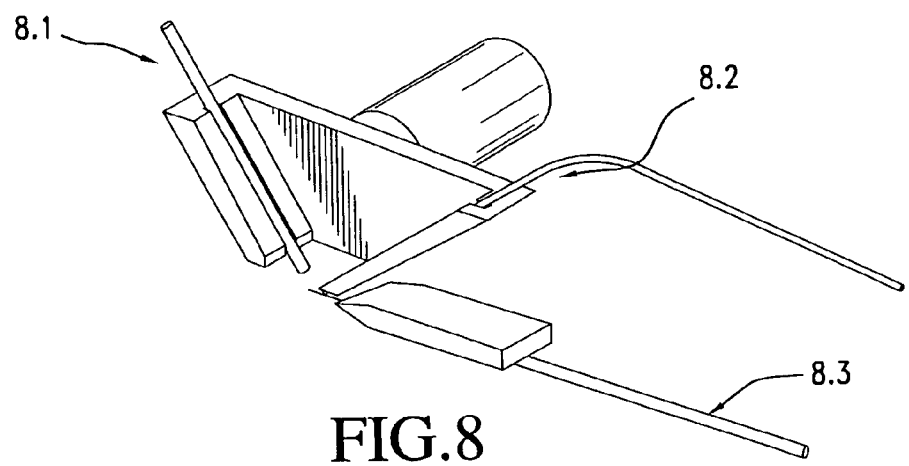
FIG. 8 is a diagrammatic top perspective illustration of a feedback assembly for beam deflection feedback with optical fibers.
Figure 9:
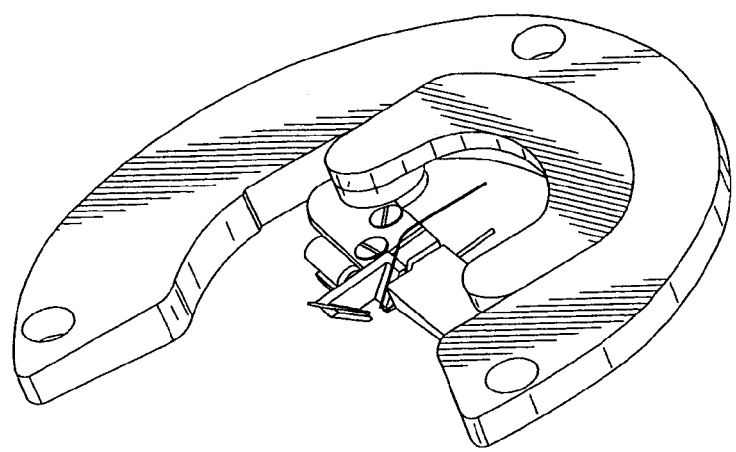
FIG. 9 is a diagrammatic top perspective illustration of a tip mount for a two-fiber beam deflection system.

The first method is illustrated in FIG. 8, wherein standard mirrors in a beam deflection tip and a scanning tip mount are replaced with two optical fibers (8.1) and (8.2). The tip mount provides a space between the illuminating fiber (8.1) and the collecting fiber (8.2). This space allows a lens to view the sample when a cantilevered tip is employed. The assembly in FIG. 8 can then be incorporated into a tip mount, an example of which is illustrated in FIG. 9, which will fit in the tip scanning flat scanner as will be shown below.

Figure 10:
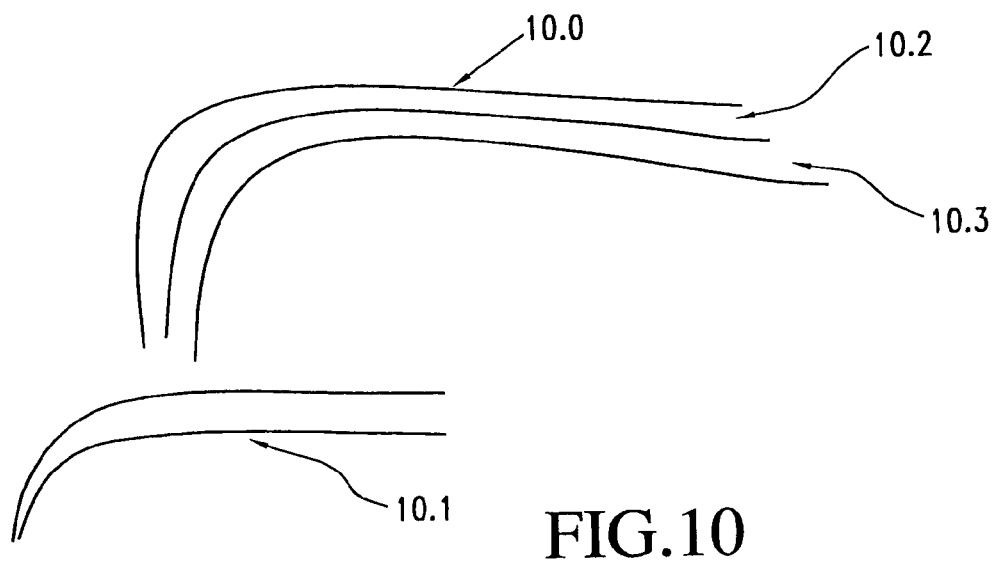
FIG. 10 is a diagrammatic illustration of a cantilevered multichannel tip for directing laser light to the cantilevered tip of an SPM sensor.

A second method that will allow for a tip and sample scanning microscope that is also based on beam deflection is illustrated in FIG. 10, and uses a cantilevered multiple channel fiber probe (10.0) to direct a point of light onto a second cantilevered AFM, NSOM or other SPM sensor (10.1). The point of light is produced by a beam directed through one channel (10.2) and is collected through another channel (10.3) of the multiple channel fiber. It will be understood that the multiple channel cantilevered element can be used with more than two channels. One example, in the vein of FIG. 10 but not to exclude others, is a five channel device, in which one channel illuminates the SPM sensor cantilevered and the other four collect the reflection to varying degrees depending on the position both normally and laterally of the sensor cantilever from the multi channel tip.

Alternately, for example, there could be a three channel tip in proximity to the cantilever of the SPM sensor with two channels transmitting phase correlated laser beams and the other channel acting as a collector. A variety of numbers of channels can be used including, of course, straight tips and a combination of amplitude and phase signals. In addition, various movements of the sensor cantilever or straight tip could be used also. Also, any optical phenomena that can monitor the SPM movement can be used.

3. Internal Feedback

Figure 11:
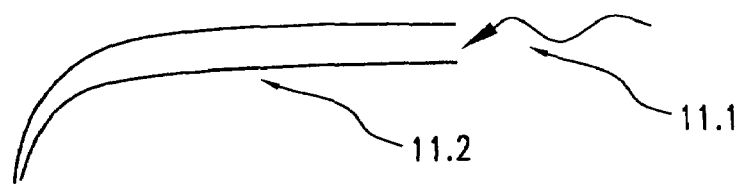
FIG. 11 is a diagrammatic illustration of an internal feedback mechanism using an optical waveguide and a beam of light injected into the waveguide.

A third general method of feedback that could be used when waveguides, such as optical fibers, are employed as AFM based SPM sensors is illustrated in FIG. 11. In this figure a laser beam (11.1) is injected into a cantilevered fiber that acts as an AFM sensor. As the tip (11.2) is modulated, light is reflected from the tip region back along the direction from where it was injected. The reflected light is also modulated in the fiber and the phase and amplitude components of this modulated return signal can be appropriately detected and used as a feedback signal.

Finally, all of the above methods can be used in a variety of contact, intermittent contact or non-contact modes of AFM operation and any other such emulations of tip/sample scanning systems. In addition, although certain geometries and materials are employed in much of the discussion above, a variety of emulations are possible with different materials such as bimorphs, other piezo ceramic materials including those that have piezoresistive coatings, and different geometries for the imaging sensor and the feedback sensor etc. Also, in the case of a multichannel fiber, a laser can be delivered through one of the channels for transient heating and cooling of the cantilever for gentle cantilever oscillation without piezoelectric elements and in a way that provides very high resolution.

Figure 12:
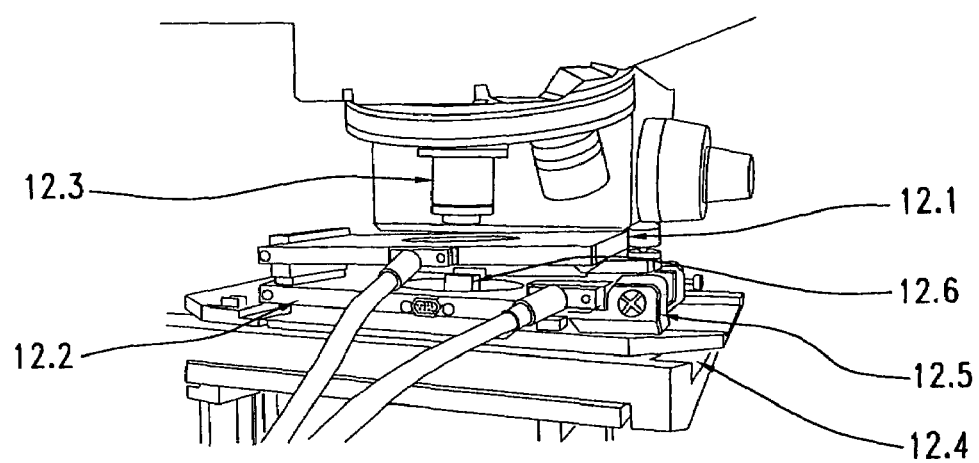
FIG. 12 illustrates a two-plate tip/sample scanning SPM between the lens of a microscope objective and the stage of a conventional microscope.
Figure 13:
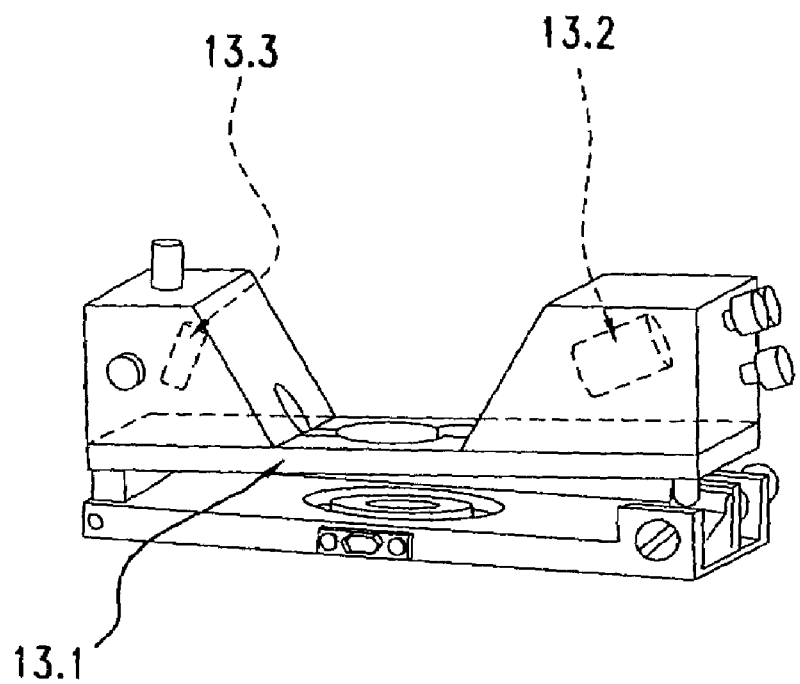
FIG. 13 illustrates an upper plate design variant, incorporating a laser diode and PSD.

An example of a tip/sample scanning multiple plate reconfigurable microscope in accordance with the present invention, not to exclude other emulations, is a two plate version illustrated in FIG. 12 at (12.1) and (12.2), with two of the plates allowing for either tip or sample scanning. In this mode of operation, the two plate tip/sample scanning microscope can be inserted between the lens (12.3) and the sample stage (12.4) of a standard upright optical microscope with all the lenses of the microscope freely rotatable. The long range motion of the plates can be simply due to the large range of such flat scanning plates or, as shown, a device such as a stepping motor (12.5), inchworm, any dc motor etc. can be used for the far approach of the tip to the sample (12.6). The tip scanning plate can then be lifted off or detached if it is either screwed on, or clipped on or attached by some other means to the bottom plate and a plate for conventional contact operation (13.1) can be inserted (see FIG. 13) with a diode laser (13.2) and position sensitive detector (PSD) (13.3).

Alternately, the same tip scanning upper plate (12.1) can be used, with a diode laser and a position detector added onto this plate. With the tip and sample scanning plates in place, the instrument allows for a z extension between the sample and the tip of as much as 0.2 mm without the use of stepping motors, inchworms and the like. This has never been possible previously. With one of the plates in place this extension will be reduced to half the 0.2 mm value.

Many accessories, including liquid cells, can be used with these unique new microscopes. In one emulation, with the top plate as in FIG. 13, the liquid cell would have the following structure for appropriate beam deflection. Liquid cell operation is also feasible with other methods of beam deflection described above such as with tuning fork-like feedback. Small emendations would then have to be made in the design of the liquid cell seen in FIG. 14.

Figure 14:
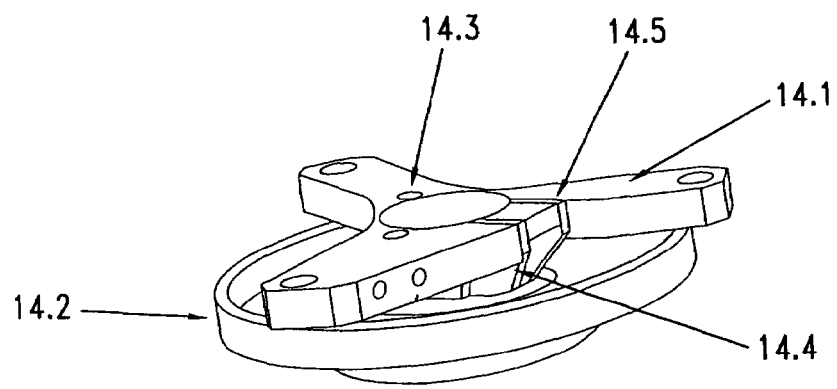
FIG. 14 is a top perspective view of one embodiment of a liquid cell.

In the design in FIG. 14, the tip mount (14.1) is placed on a top plate that can either be a scanning plate or a non-scanning plate, and the liquid cell (14.2) is placed on the sample bottom plate of the microscopes described above. In addition, there are two channels (14.3) for the entrance and exit of liquid in order to exchange the liquid in the liquid cell.

Figure 15:
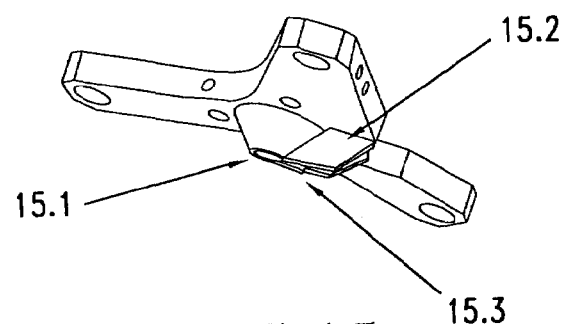
FIG. 15 is a bottom perspective view of a tip mount for a liquid cell.

The construction of the tip mount as illustrated in FIG. 15 includes a glass window glued to the bottom of the conical bore (15.1) in the tip holder. Also illustrated are two ferromagnetic poles (15.2) and (14.4) of a magnet. These poles form a magnetic circuit with an air gap or window, and between these two poles sits the tip holder that contains the tip. Above this region sits a magnet (14.5) that imposes a magnetic field. The tip holder is positioned so that the tip sits below the window (15.3).

Figure 16:
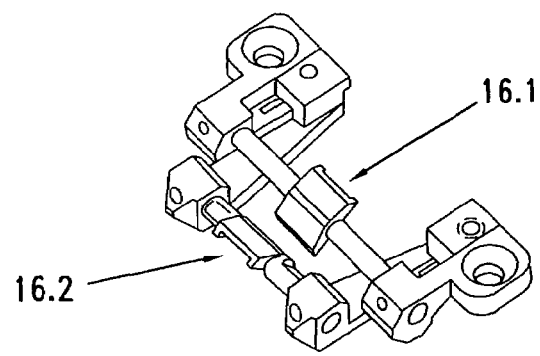
FIG. 16 is a perspective view of a double mirror bridge for a liquid cell having conventional diode laser reflection feedback.

As illustrated in FIG. 16, when a liquid cell is used with the conventional beam deflection system for feedback, a double bridge design is placed above the window to direct the light to the tip (16.1) and after that to direct the reflected light to the photodetector (16.2). This bridges consists of two mirrors with a gap, and because of the gap between these two mirrors this maintains the view of the sample with an upright microscope from the top. The design gives flexibility to adjust both bridges in terms of the spacing between the two mirrors and also in terms of the relative angle.

Figure 17:
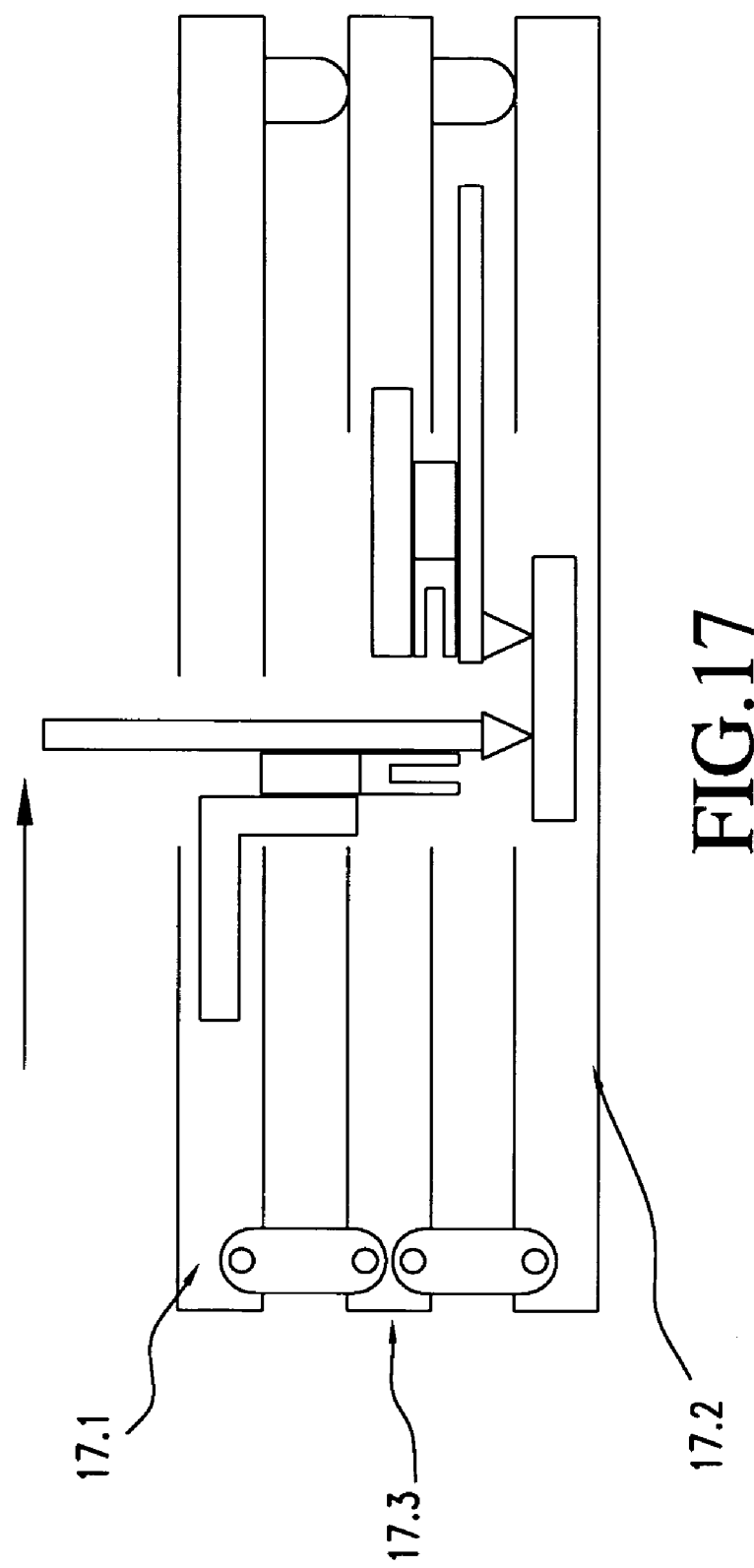
FIG. 17 is a diagrammatic illustration of a three plate microscope design.
Figure 18:
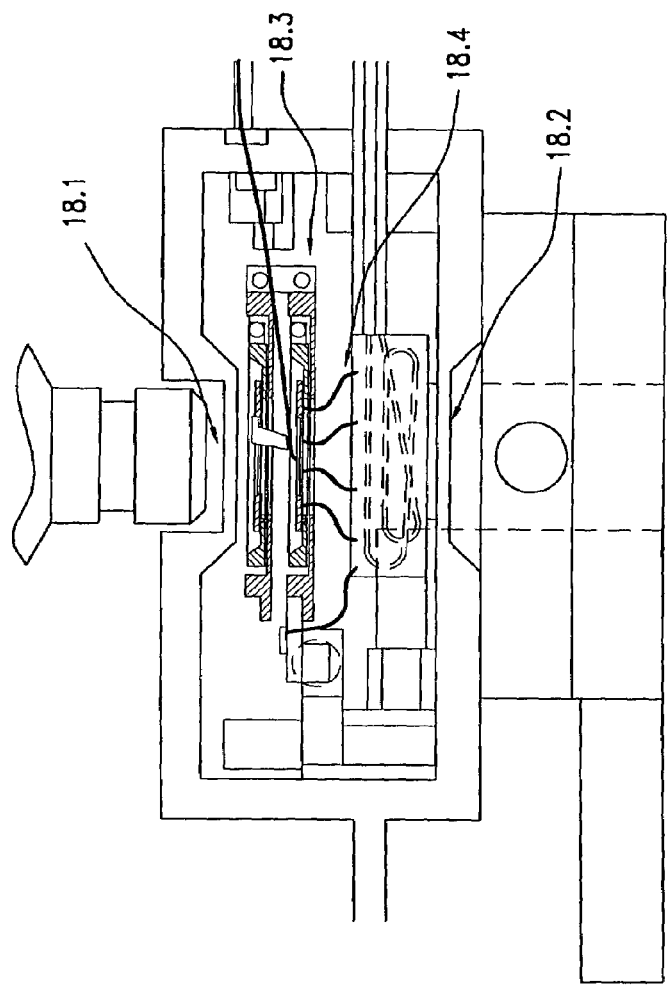
FIG. 18 illustrates a low-temperature version of a multiple plate microscope design.

In another possible arrangement, this multiple plate SPM instrument can be built with the capability to scan independently two tips in addition to allowing sample scanning. This is another capability that no previous SPM instrument has ever had. To accomplish this, three plates placed one on top of another are used, as illustrated in FIG. 17. The two outer plates (17.1) and (17.2), respectively, can scan the sample or the tip while a plate (17.3) sandwiched between these two plates can also hold a tip. The tip on this plate, in one emulation, is brought in contact with the sample using piezoelectric tip modulation and the electrically or optically based detection methods described above.

Feedback can be accomplished with the sample scanning plate, or the intermediate plate holding this tip could have the same feedback and scanning capabilities as plate (17.2). The tip scanning outer plate (17.2) will hold the second tip. This tip will be brought into contact with the sample through the hole in the intermediate plate. The feedback on this second tip will be accomplished by the tip scanning plate (17.2). In this emulation one of the tips is a straight tip and the other is a cantilevered tip, but the design is capable of using two straight or two cantilevered tips or one of each connected to either one of the two tip scanning plates.

The above two or three plate ultrathin SPM design can be readily used for optical cryostats and for cryostats in general. Cryostats have limited space, and the present microscope design is ideal for SPM in a cryostat. In the specific case of the optical cryostat there is limited space between parallel optical windows (18.1) and (18.2) through which radiation has to enter and exit. The present SPM design is ideal to be inserted between the windows labeled (18.1) and (18.2) in either the two (18.3) or three plate design. In terms of the cooling methodology that could be used, it could be cold braids (18.4) to cool the sample or a cold finger, or a surrounding liquid or gas coolant. In the case of braids (18.4) or a cold finger, the tip is at room temperature and this is an advantage in a tip scanning mode since the scanning range is affected by temperature.

Figure 19:
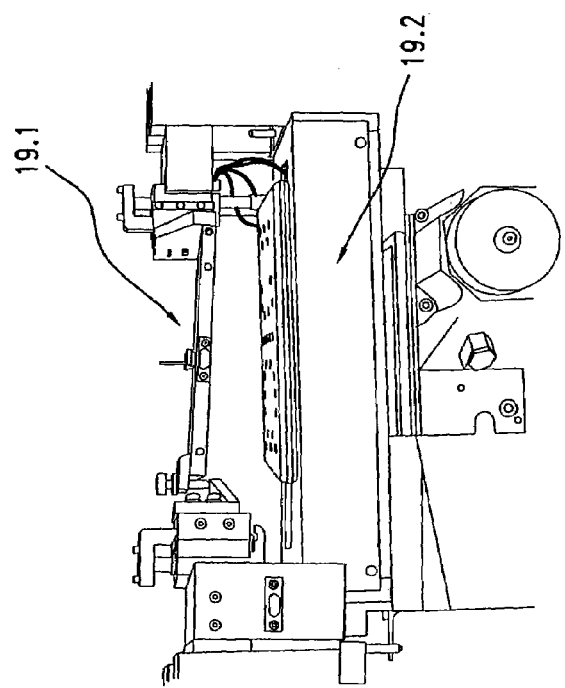
FIG. 19 illustrates a microscope having a single plate as a tip scanner with a large sample stage.

Even though the design of this reconfigurable multiplate microscope has been described in terms of specific designs, the inventions are very general and can be applied to many other designs. For example, as illustrated in FIG. 19, the invention permits a tip scanning plate (19.1) to function without a bottom plate but with a large sample scanning stage (19.2) that can be chosen as to need. The tip scanner can also be attached to the lens of a regular microscope to have on line the tip and the lens viewing the sample.

The designs of the present invention are also generally applicable, such as those with the liquid cell, the tuning-fork, the new beam deflection methodologies etc. Also, the design is ideal for working with any type of tip, including without limitation, straight tip, cantilevered tip, regular silicon cantilevers, including those made specially for near-field optical applications, and gold tipped cantilevers that are made specially for apertureless near-field microscopy and for solid immersion lenses that can sit on the top plate of a dual plate microscope with fine adjustment of the SIL relative to the lens of the microscope.

Simply stated there has been no microscope with such functions previously.

Applications of the devices and methods of the invention encompass all areas of scanned probe microscopy and in addition, the two plate design allows the system to be very effectively used for fiber alignment and for automatic component assembly of integrated optical elements. For these latter applications, the system could have added lasers of welding and attachment of components or other devices for assembly.

Although the invention has been described in terms of preferred embodiments, it will be understood that numerous modifications may be made without departing from the true spirit and scope thereof, as set forth in the following claims.

What is claimed is:

1. A scanning probe device, comprising:
   first and second spaced supports;
   a probe mounted on said first support;
   means for mounting a sample having an optical axis at a sample location on said second support, said first and second supports being aligned with said optical axis of said sample location to provide a free optical access channel to said sample from both above and below the sample location, whereby an aperture of a lens or a beam directing system for said device can be aligned with said optical axis above or below the sample location; and
   at least one of said first support and said sample location on said second support being scannable.

2. The device of claim 1, further including an aperture in each of said supports, both apertures being aligned with said axis so that a beam from a beam-directing system has a free channel to said sample location.

3. The device of claim 1, wherein said first and second supports are relatively movable to position said probe with respect to said sample location.

4. The device of claim 1, wherein said first and second supports are relatively movable in x-y planes, and where at least one of said supports is movable in a z direction perpendicular to one of said x-y planes to adjust the location of said probe with respect to said sample location.

5. The device of claim 1, further including:
   an intermediate support located between said first and second supports;
   a second probe mounted on said intermediate support; and
   said intermediate support cooperating with said first and second supports to provide said free channel to said sample optical axis.

6. The device of claim 1, wherein said means for mounting a sample is located in said free channel.

7. The device of claim 1, further including a sensor for detecting the motion of said probe with respect to said sample.

8. The device of claim 7, further including a feedback mechanism operable in response to the detected motion to adjust the location of said probe with respect to said sample.

9. The device of claim 8, wherein said feedback mechanism includes a tuning fork.

10. The device of claim 8, wherein said feedback mechanism includes an optical fiber detector adjacent said sensor for delivery of radiation to and collection of radiation from said sensor.

11. The device of claim 1, further including a cryostat enclosing said supports while maintaining said free optical axis.

12. The device of claim 1, further including a liquid cell at said sample location for containing a sample, said liquid cell being aligned with said optical axis for unobstructed viewing of said sample.

13. The device of claim 1, wherein said probe is selected from the group of probes consisting of solid immersion lenses, silicon based apertured or nonapertured probes, and light concentrating nanoparticle probe tips.

14. The device of claim 1, wherein said first and second supports are incorporated in a beam directing system.

15. The device of claim 1, wherein said first and second spaced supports are connectable to each other.

16. The device of claim 1, wherein said probe is mounted in said first support aperture and wherein said sample location is in said second support aperture.

17. The device of claim 1, further including:
a third support located spaced from said first and second supports and aligned with said free channel, said supports being in corresponding x-y planes, at least one of said supports being relatively movable with respect to the remaining supports;
a second probe mounted on said third support; and
the spacing between at least one of said first and third supports and said sample location being adjustable in a direction perpendicular to the x-y plane of said second support.

18. The device of claim 17, further including a feedback system for detecting and adjusting the locations of said probes with respect to a sample at said sample location.

19. The device of claim 18, wherein said optical axis is aligned with a beam directing system for a scanned probe microscope.

20. A method for scanned probe microscopy, comprising:
mounting a probe on a first support;
mounting a sample having an optical axis on a second support;
moving one of said supports in x-y directions to scan said probe with respect to said sample; and
providing in each said support an aperture, said apertures having a common axis aligned with the optical axis of said sample to provide a free optical channel to said sample; and
sensing the interaction of said probe and said sample.

21. The method of claim 20, further including:
illuminating said sample through said free optical channel by a beam directing system aligned with said optical axis;
producing a shadow or point reflection on said sample with said probe and;
repetitively detecting differences between sensed properties as a function of the location of said probe with respect to said sample to produce images of said sample.

22. The method for scanned probe microscopy of claim 20, further including:
incorporating said sample and said probe in a beam directing system aligned with said optical axis.

23. The method of claim 22, further including cooling said sample and said supports.

24. The method of claim 22, further including illuminating said sample with an optical, electron optical, ion, atomic or molecular beam.

25. The method of claim 22, wherein incorporating said support and probe in a beam directing system includes aligning a confocal optical microscope or an evanescent wave optical microscope with said axis.

26. The method of claim 20, further including mounting said probe on a resonator affixed to said first support.

27. The method of claim 20, further including:
moving said sensor in a z direction perpendicular to said sample location; and
sensing properties of a sample at said sample location as a function of the motion of said sensor in said z direction.

28. A scanning probe device, comprising:
at least one support;
means for mounting a sample at a sample location;
a probe mounted on said support;
said support being aligned with said sample to provide a free channel along said optical axis between the center of a beam directing system centered above or below the sample;
at least one of said support and said sample location being scannable;
a sensor for detecting motion of said probe with respect to said sample; and
a feedback mechanism adjacent said sensor and operable in response to the detected motion to adjust the location of said probe with respect to said sample.

* * * * *